Figure 1:
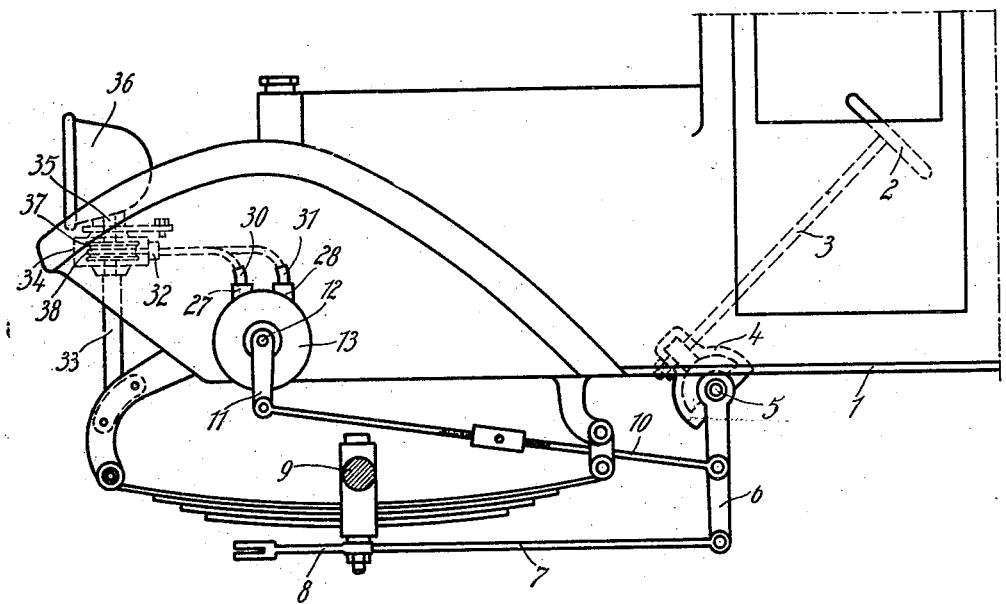

Aug. 12, 1930.  F. R. DIETRICH  1,772,799
DIRIGIBLE HEADLIGHT
Filed Feb. 4, 1929  2 Sheets-Sheet 1

Inventor
Friedrich Richard Dietrich
by Knight Bro.
Attorneys

Aug. 12, 1930.   F. R. DIETRICH   1,772,799
DIRIGIBLE HEADLIGHT
Filed Feb. 4, 1929   2 Sheets-Sheet 2
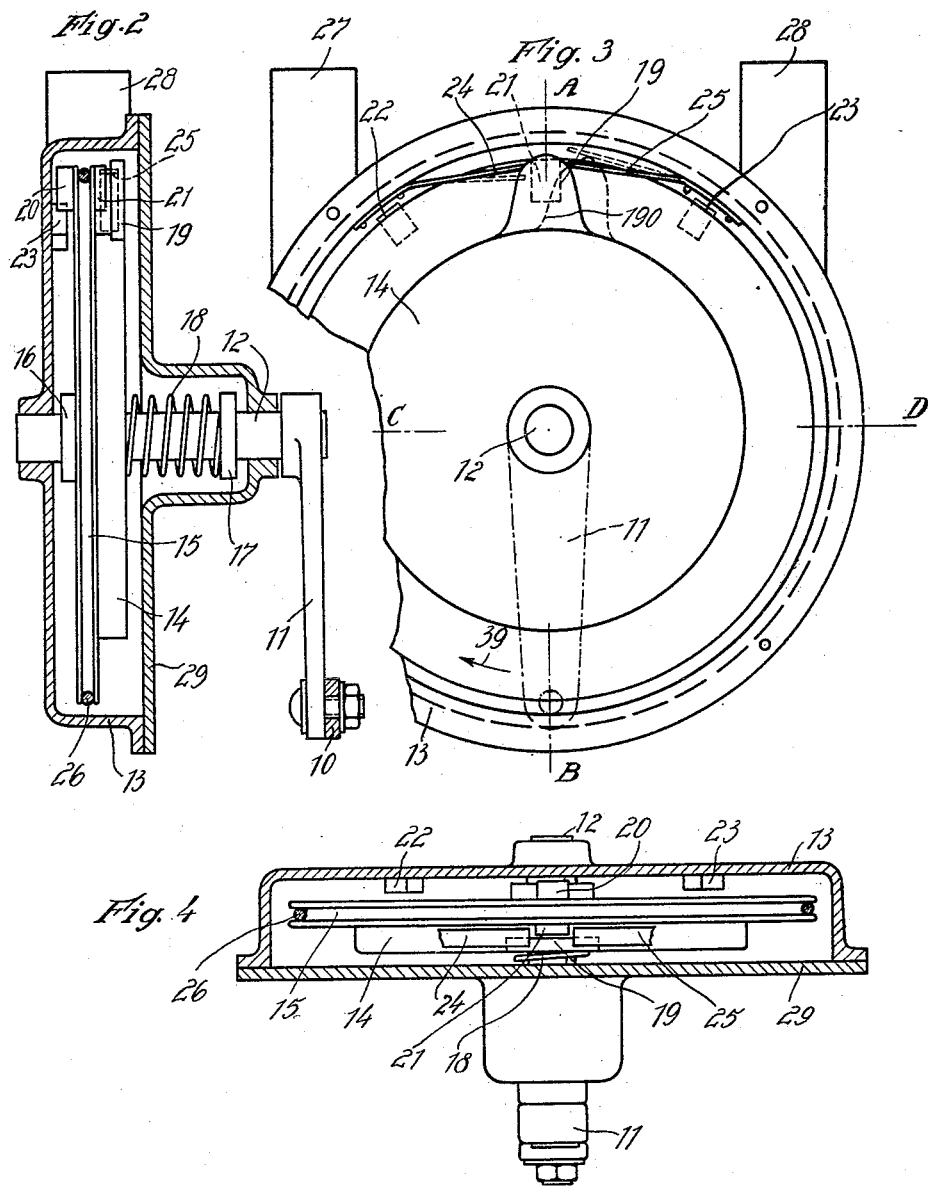

Patented Aug. 12, 1930

1,772,799

UNITED STATES PATENT OFFICE

FRIEDRICH RICHARD DIETRICH, OF PASING, NEAR MUNICH, GERMANY

DIRIGIBLE HEADLIGHT

Application filed February 4, 1929, Serial No. 337,452, and in Germany February 3, 1928.

My invention relates to improvements in steering gear for the headlights of vehicles, more particularly the headlights of automobiles.

One object of my invention is to bring the beams of the headlights earlier into the position of the greatest deflection than the steering wheels when passing from a straight road into a curve, and to swing them back earlier into the initial position than the wheels when passing from a curve into straight ahead travel.

A further object of my invention is to deflect the beams of the headlights at substantially larger angles of deflection if the angle of deflection of the steering wheels is small, but to prevent the beams from taking part in the further deflection when the wheels have attained a large angle of deflection.

A still further object of my invention is to provide a reliable steering mechanism for the head lights of vehicles, which is proof against vibrations, dirt and dampness, and which may be easily adapted to various types of vehicles.

According to my invention a gearing is provided between the steering mechanism of the vehicle and the rotatable parts of the headlights, which is capable of swinging the rotatable parts of the headlights earlier into the position for travel straight ahead than the steering wheels, when passing from a curve on to a straight road.

According to a further modification of my invention the novel gearing is also adapted to bring the rotatable parts of the headlights earlier into the position of largest deflection than the steering wheels when passing from a straight road into a curve.

In the drawings affixed hereto and forming part of my specification an embodiment of my invention is illustrated by way of example.

In the drawings

Fig. 1, illustrates part of a vehicle equipped with my improved headlight steering mechanism, Fig. 2, the portion 13 in Fig. 1 of the gearing of the steering mechanism in larger scale, partly in section along the line A—B of Fig. 3, Fig. 3, the gearing of Fig. 2 in plan view with the cover of the casing removed, and Fig. 4 illustrates, the gearing, partly in section along the line C—D of Fig. 3.

Like parts are indicated by like letters of reference in the various figures of the drawings.

Referring to Fig. 1, 1 is the chassis of the vehicle on which is mounted the steering wheel 2 with the steering column 3, which by means of the worm gear 4 drives the shaft 5 carrying the steering arm 6. This arm is connected by the rod 7 to the steering mechanism 8 of the front wheels journaled upon the axle 9. The steering arm 6 is connected by a further rod 10 to the crank arm 11 mounted on the spindle 12, which is journaled in casing 13.

On the spindle 12, Figs. 2 to 4, is splined the driving element 14 of a two-element friction clutch. The driven element 15 of the clutch, which is a rope pulley, is rotatably mounted on the spindle 12. The spindle is provided with collars 16 and 17. Against the collar 16 abuts the pulley 15 and against the collar 17 the spring 18 disposed to frictionally hold the two clutch elements 14 and 15 in engagement.

On disc 14 is mounted the cam 19, and on correspondingly opposite sides of pulley 15 are provided the lugs 20 and 21 (Fig. 4). On the bottom of the casing 13 are provided the stops 22 and 23 which cooperate with lug 20, and on the inner periphery of casing 13 are provided the latches 24 and 25 consisting of leaf springs, which face each other with their free ends. The ends of these latches are sufficiently spaced apart to enclose lug 21 as shown in Fig. 4.

Around the pulley 15 is slung the cord or draw member 26 in the form of a Bowden wire the wire passing out of the casing 13 through the tubular branches 27 and 28. The casing is closed by the cover 29 which carries one journal of the spindle 12, the other journal being located in the bottom of the casing.

To the branches 27 and 28 are connected the flexible tubes 30 and 31 (Fig. 1), which are fixed to corresponding tubular members 32 of the casing 34 mounted on the vehicle 1 by a support 33. In this latter casing is journaled the vertical rotary spindle 35 of the headlight 36, upon which is mounted the rope pulley 37 around which is slung the draw portion 38 of the Bowden wire which passes from the casing 13 to the casing 34 through the tubular members 30 and 31.

The diameter of the pulley 37 is approximately half the diameter of the pulley 15. The gearing thus has a speed increase ratio, and the headlight 36 is moved relatively at a greater angular speed than the steering wheels of the vehicle.

The mode of operation of the mechanism is as follows: If arm 11 is moved in the direction of the arrow 39, Fig. 3, when turning into a curve, the driving clutch element 14 entrains the driven element 15 by friction and the cam 19, when reaching the dotted position 190, forces the latch 25 out of the path of lug 21. The driven element 15 is thus able to turn with the driving element 14 and to rotate by means of the Bowden wire 26 the pulley 37 of the headlight 36. As soon as lug 20 reaches the stop 23 on the casing the element 15 is arrested, and while the steering wheels can be further deflected, the beams of the headlights no longer take part in the motion. When the wheels are thus deflected further clutch element 14 slides upon the arrested element 15.
When returning into the straight position the arm 11 is turned in the opposite direction, and clutch element 15 through element 14 instantly participates in this reverse rotation and thus reaches the straight ahead position before the wheels do. There it is arrested by the latch 24 which is now in the path of lug 21. When returning the arm 11 further into the straight ahead position of the wheels clutch element 14 again slides upon the arrested element 15 until the arm 11 and element 14 have reached the straight ahead position.

The process is similar when the steered wheels are deflected in the opposite direction.
Various modifications and changes may be made without departing from the spirit and the scope of the invention.

I claim as my invention:

1. In a steering mechanism for rotatable vehicle headlights, operated by the vehicle steering mechanism, a gearing interposed between said vehicle steering mechanism and the headlights, said gearing having means for rotating the headlights into the deflected position and for returning them into the straight ahead position earlier than the vehicle wheels and means for arresting the headlights at their desired maximum angle of deflection before the vehicle wheels are deflected by that angle and for arresting the headlights on their return into the straight ahead position before the vehicle wheels have returned into that position, irrespective of the angles at which the headlights and wheels have been turned.

2. In a steering mechanism for rotatable vehicle headlights, operated by the vehicle steering mechanism, a gearing interposed between said vehicle steering mechanism and the headlights, said gearing having means for rotating the headlights into the deflected position and for returning them into the straight ahead position earlier than the vehicle wheels and means for arresting the headlights at their desired maximum angle of deflection before the vehicle wheels are deflected by that angle and for arresting the headlights on their return into the straight ahead position before the vehicle wheels have returned into that position, irrespective of the angles at which the headlights and wheels have been turned, said arresting means being disposed to normally lock the headlights in the straight ahead position when the vehicle wheels return to the straight ahead position.

3. In a steering mechanism for rotatable vehicle headlights, operated by the vehicle steering mechanism, a gearing interposed between said vehicle steering mechanism and the headlights, and comprising a friction clutch having its driving member connected to the vehicle steering mechanism and its driven member connected to the headlights and geared to the latter to operate the headlights relatively at a greater angular speed than the angular deflection speed of the vehicle wheels, stopping elements for limiting the deflection angle of the headlights in either direction from the straight ahead position, means for locking said driven clutch member in the straight ahead headlight position when the vehicle wheels are in that position and a cam connected with the driving clutch member for releasing the locking means for said driven member when the vehicle wheels are deflected in one direction to permit the headlights to swing in the same direction within their angular limitation determined by said stopping elements, said locking means arresting said driven clutch member on its return to the straight ahead position of the headlights before the vehicle wheels have returned to said position, irrespective of the angles at which the headlights and wheels have been deflected.

4. In a steering mechanism for rotatable vehicle headlights, operated by the vehicle steering mechanism, a gearing interposed between said vehicle steering mechanism and the headlights, and comprising a friction clutch having its driving member connected to the vehicle steering mechanism and its driven member connected to the headlights and geared to the latter to operate the headlights relatively at a greater angular speed than the angular deflection speed of the vehicle wheels, stopping elements for limiting the deflection angle of the headlights in either direction from the straight ahead position, two spring latches disposed adjacent to said driven clutch member and a lug on said member disposed between said latches, whereby said member is normally locked in the straight ahead headlight position, a cam on said driving clutch member disposed adjacent to said latches to lift one latch when the vehicle wheels are deflected in one direction to permit the driven clutch member and the headlights to swing in the same direction within the angular limitation determined by said stopping elements, the other latch engaging said lug and arresting said driven member on its return to the straight ahead position before the vehicle wheels have returned to said position, irrespective of the angles at which the headlights and wheels have been deflected.

In testimony whereof I affix my signature.

FRIEDRICH RICHARD DIETRICH.